United States Patent [19]

McAlister

[11] Patent Number: 4,465,721

[45] Date of Patent: Aug. 14, 1984

[54] PREPARATION OF POLYCARBONATES

[76] Inventor: Roy E. McAlister, 5285 Red Rock North, Phoenix, Ariz. 85018

[21] Appl. No.: 508,132

[22] Filed: Jun. 27, 1983

Related U.S. Application Data

[60] Division of Ser. No. 218,501, Dec. 22, 1980, Pat. No. 4,414,264, which is a continuation-in-part of Ser. No. 32,633, Apr. 23, 1979, Pat. No. 4,243,779.

[51] Int. Cl.$^3$ ............................................. C08G 63/62
[52] U.S. Cl. ..................................... 528/86; 525/434; 525/437; 525/446; 525/462; 525/474; 525/534; 528/166; 528/196; 528/198; 528/200; 528/204; 528/370; 528/371

[58] Field of Search ................. 528/86, 166, 196, 198, 528/200, 204, 370, 371; 525/437, 446, 434, 474, 462, 534

[56] References Cited

U.S. PATENT DOCUMENTS 3,547,790 12/1970 Dannels et al. ........................ 528/86
3,738,963 6/1973 Praetorius et al. ................... 528/86

Primary Examiner—Lester L. Lee
Attorney, Agent, or Firm—Cushman, Darby & Cushman

[57] ABSTRACT

This invention is concern with a method of preparing a polycarbonate resin by passing a solution of dihydric phenol through a source of hydrogen and reacting the solution with carbon monoxide.

8 Claims, 7 Drawing Figures

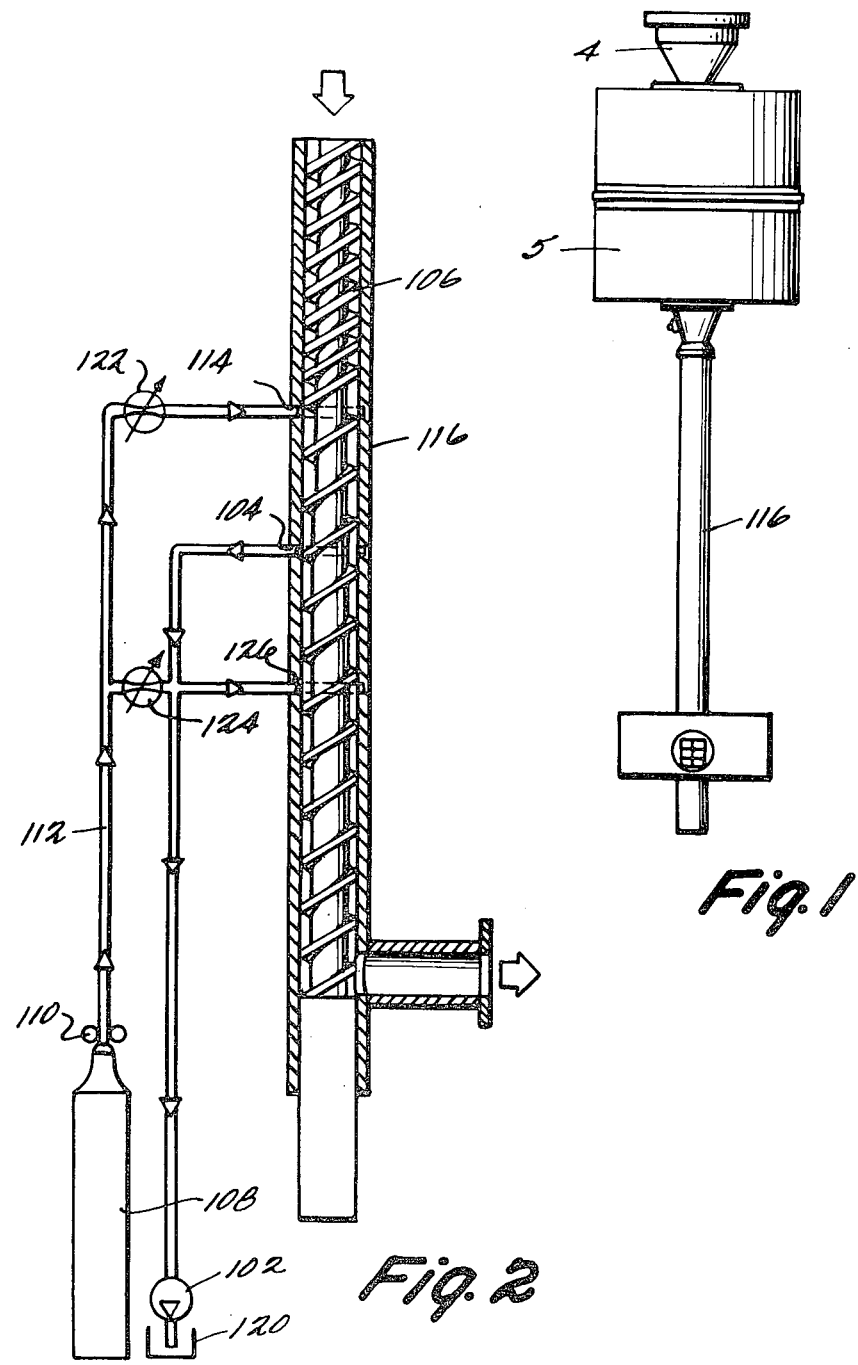

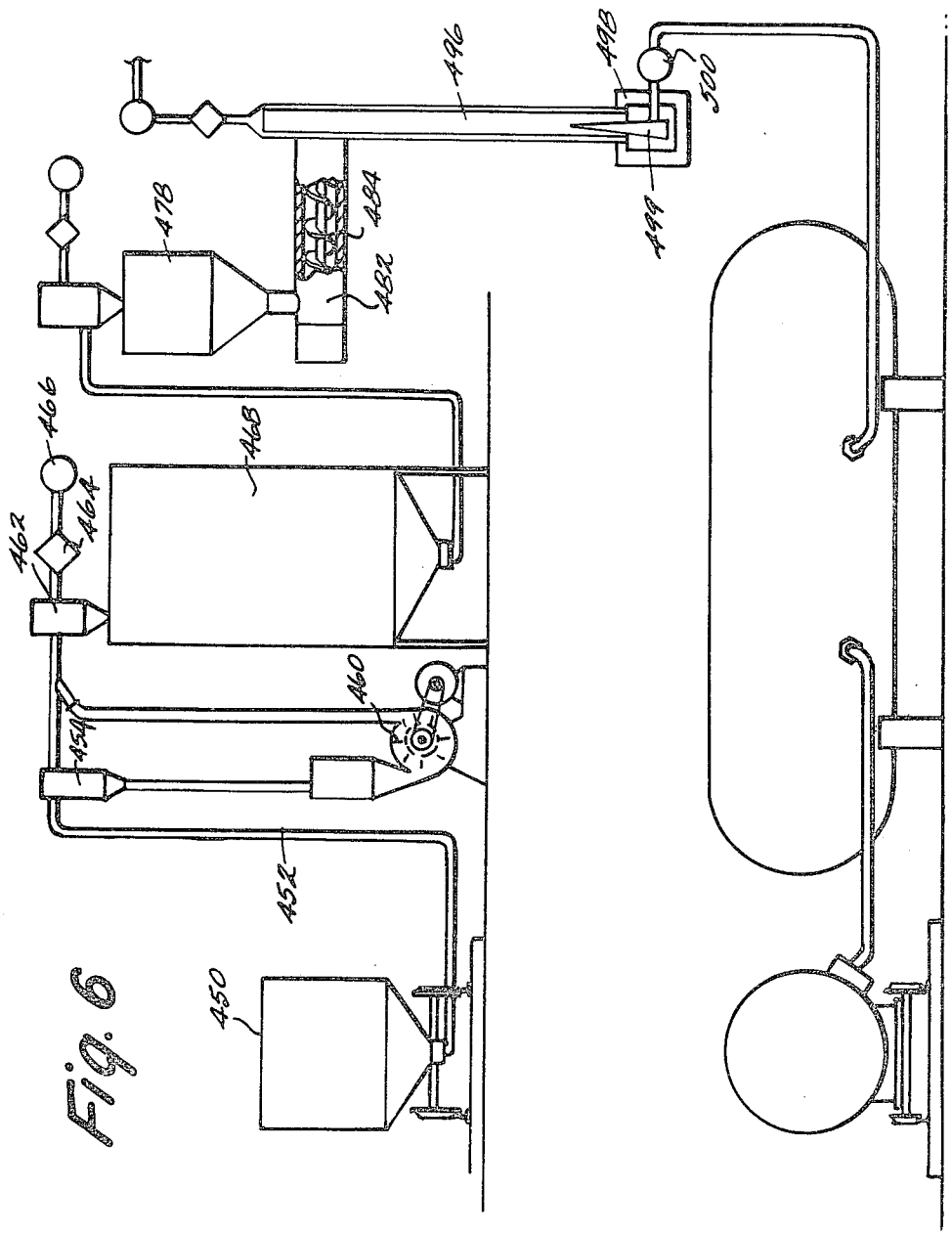

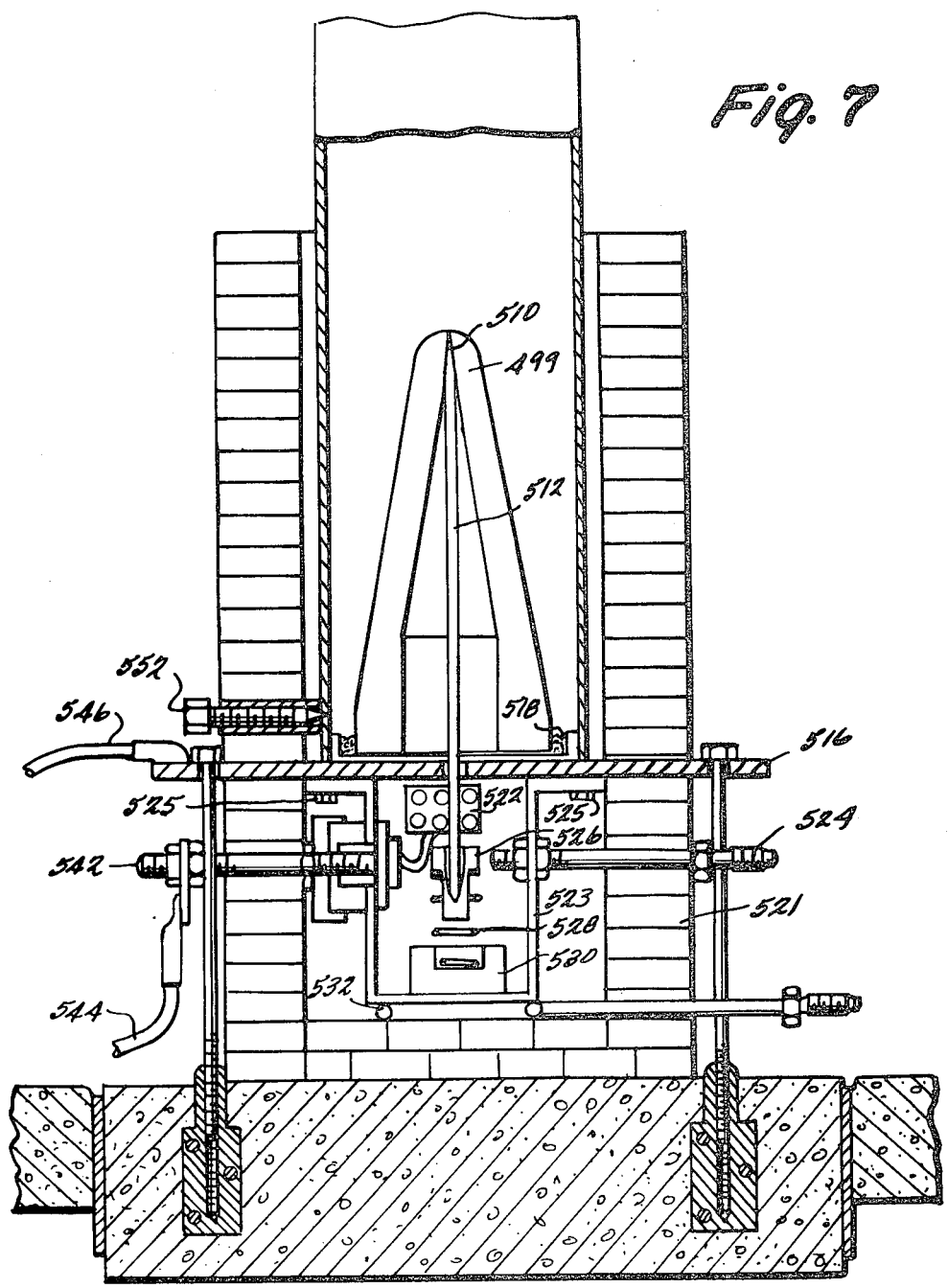

PREPARATION OF POLYCARBONATES

This is a division of application Ser. No. 218,501, filed Dec. 22, 1980 and now U.S. Pat. No. 4,414,264 which is a continuation-in-part of application Ser. No. 32,663 filed Apr. 23, 1979 and now U.S. Pat. 4,243,779.

This application is also related to my copending application Ser. No. 6,654 filed Jan. 26, 1979, entitled "Improved Plastic Solar Panel Structure and Method and Apparatus for Making the Same" and now U.S. Pat. 4,254,331. The entire disclosure of my copending applications are hereby incorporated by reference and relied upon.

BACKGROUND OF THE INVENTION

Numerous previous investigators have described methods for chemically passivating thermoplastic resins and for protecting certain thermoplastic resins from ultraviolet attack by additives that adsorb incident radiation. Rauhut U.S. Pat. No. 3,974,368, Aug. 10, 1976, describes passivating polyethylene surfaces using silanes, e.g., dimethyldichlorosilane and the like. Uhl U.S. Pat. No. 3,810,775, May 14, 1974, describes a process for making water repellant fiberous materials by applying a copolymer of ethylene and a vinyl halosilane or vinyl alkoxy silane. Anos and Moyer U.S. Pat. No. 3,423,483, Jan. 21, 1969, describes production of a fluorescent polymer using polybenzoxazole units.

A modern process particularly suitable and often employed for the production of thermoplastic aromatic polycarbonates consists of reacting phosgene with suitable bisphenols in an aqueous solution or suspension of alkali or alkaline earth metal salts. The polycarbonates that are obtained are high molecular weight linear chains of repeating units "X" and "Y"; distributed more or less at random; ranging from high ratios of "x"/"y" to high ratios of "y"/"x" having end groups of [HO—] and

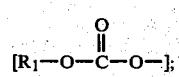

where "X" is

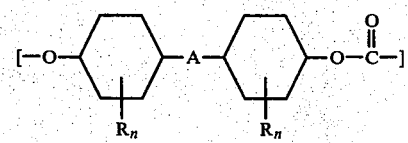

and Y is

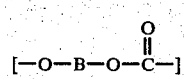

all more fully described in Wulff, Schnell, and Bottenbruch U.S. Pat. No. 3,422,065, Jan. 14, 1969, the entire disclosure of which is hereby incorporated by reference and relied upon.

The linear chain polycarbonate thus produced can be cross-linkd in the presence of oxygen or free radical forming catalysts such as dibenzyl peroxide and dicumyl peroxide with the resultant cross-linked polymer being much more insoluble than the linear polymer to high temperature steam. A preferred bisphenol intermediate for the cross-linked polycarbonate is "Bisphenol Cy" 1,1-bis(4 hydroxyphenyl) cyclododecane, but the resulting cross-linked resin presents substantially more difficult processing parameters than the linear polycarbonate.

Examination of the stepwise attack on linear polycarbonates by strong bases offers an alternative to cross-linking for purposes of producing stress corrosion resistance while retaining favorable processing characteristics. Strong bases, and to a lesser extent, water, at temperatures ranging from 140° F. to 200° F. produce stress corrosion responses in linear polycarbonates. This response is enhanced by the presence of residual or induced stress and is increased with increasing temperature. Stress corrosion responses characterized by cracking, pitting, loss of ductility, and weight loss by mass fall out of exposed areas may be noted as attacks following stepwise polymer bond breakage. Chemical ractions first producing bond breakage are most likely those involving relatively energy-rich, vulnerable, end group sites on the linear polymer chain. The compounds formed by reacting the energy-rich units with stress corrodant constituents are more voluminous than the reactant and create a stress field sufficient to cause macroscopic fractures. The corrosion velocity or rate of attack is a function of the rate of supply of an environmental reactant, and the amount of energy or stress available. Corrodant diffusion rates, surface to volume effects, and crack opening by external forces thus play important roles in defining attack velocities.

The importance of the end group's chemical reactivity may be noticed by comparing preparation of thermoplastic polycarbonates with the preparation of a thermoplastic polysulfone. Polysulfone is prepared by reacting bisphenol A and 4,4-dichlorodiphenyl sulfone with potassium hydroxide in dimethyl sulfoxide. The characteristic polysulfone resin

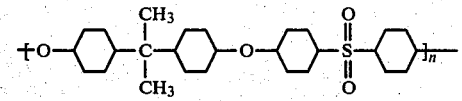

offers no site of high unit energy and minimal potential for chemical reactions causing pressure generating increased volume products. It is necessary to remove all but slight traces of water before polymerization to prevent hydrolysis of the dihydric phenol salt, a subsequent formation of the monosodium salt of 4-chloro-4-hydroxydiphenyl sulfone. End groups of [HO—] are absent.

In this connection consider the most common polycarbonate polyester resin.

Polycarbonate polyesters produced from bisphenol A are characterized by units of:

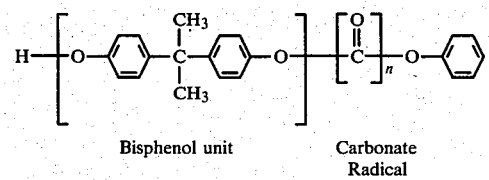

Bisphenol unit     Carbonate Radical

Polycarbonate resins may be slowly produced by a non-catalyzed condensation reaction between bisphenol A and phosgene.

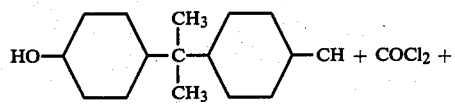 EQ-1

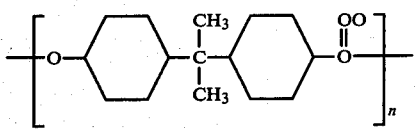 + 2HCl where n is the degree of polymerization.

This reaction may be greatly accelerated by basic catalysts. With basic catalyst acceleration, the reaction is assumed to be:

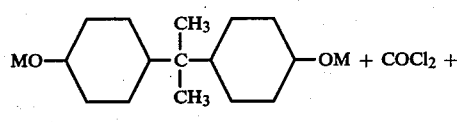 EQ-2

Metalorganic Bisphenol    Phosgene

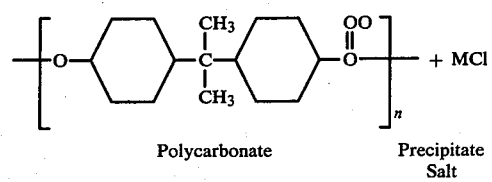 + MCl

Polycarbonate    Precipitate Salt

Where M is typically Li, Na, or K, obtained from a salt solution in aqueous medium or from salt or hydride dissolution in the fused bisphenol A resin.

Traces of the metal organic bisphenol, the catalytic salt, the hydroxyl end groups, and unreacted bisphenol in the polycarbonate resin may cause stress corrosion through the following typical stress producing reactions.

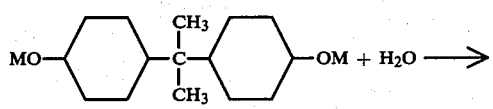 EQ-3

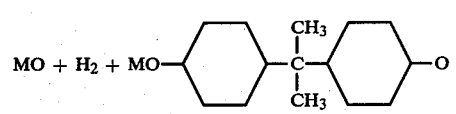

Exceptionally high proton mobilities in certain phases such as ice compared to water are illustrative of proton transfer along the hydrogen bond. Protons released by reactions with polycarbonate constituents also diffuse, forming hydroxyl and hydronium stress producing radicals.

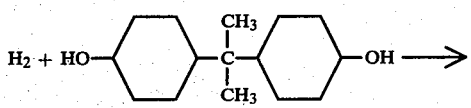 EQ-4

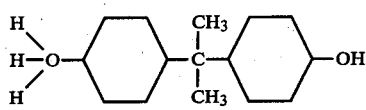

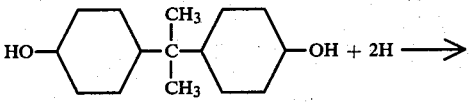 EQ-4a

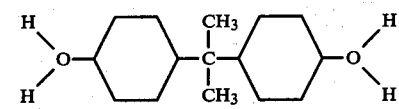

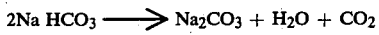 EQ-5

$2\text{Na HCO}_3 \longrightarrow \text{Na}_2\text{CO}_3 + \text{H}_2\text{O} + \text{CO}_2$ Polycarbonate resins may also be produced by catalytic synthesis of bisphenol A and carbon monoxide:

EQ-6

EQ-7

This reaction is promoted by first dissolving the bisphenol A in a suitable solvent such as tetrahydrofuran (THF) and then activating it with hydrogen. Activated hydrogen is introduced to the bisphenol A through the high shear path of reaction 300 in FIG. 5 (described later) to produce the following activated intermediate:

The activated intermediate is then immediately reacted with carbon monoxide to produce polycarbonate.

EQ-8

This linear molecule may be grown as large as desired in the form:

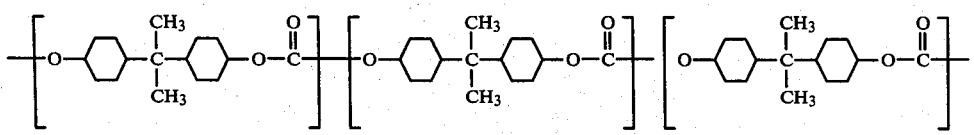

SUMMARY OF THE INVENTION

It is an object of the present invention to produce aromatic polycarbonate resins having strongly bonded end caps resulting in uniform unit site free energies of formation and resistance to chemical attack.

it is a further object of this invention to produce aromatic polycarbonate resins having strongly fluorescent polymer units resulting in interaction with incident light to wave shift ultraviolet radiation portions to visible and infrared radiation.

It is another object of this invention to produce within aromatic polycarbonate resins uniform unit site free energies of formation and include fluorescent polymer units during initital polymerization steps.

It is an additional object of this invention to react aromatic polycarbonate resins with halogenated organo compounds during thermoplastic processing of the polycarbonate resin to produce more or less uniform free energy unit sites throughout the polycarbonate chain including end caps. This object is further defined as a cost effective means for limiting the amount of reactant halogenated organosilane to only the replacement requirement for labile protons occurring at the molecular chain ends.

Stress relief annealing may be useful in occasional conventional polycarbonate product instances but upon the application of mechanical loads or thermal stress in the presence of a stress corrodant, product failures may be expected. The linear polycarbonate can, however, be modified by preferentially reacting hydrogen at the end units with a suitable halogenated intermediate such as 1,1,1-trichloro-2,2,2-trifluoroethane according to the following type:

methoxy, ethoxy, propoxy, butoxy, pentoxy, as well as monovalent hydrocarbon radicals containing inert substituents therein such as halogen atoms, e.g., chlorine, bromine or fluorine may be employed. It will be understood that where more than one R is used, they may be alike or different.

In the formulae A can be cycloalkylene, alkylidene, cycloalkylidene, or sulfone, $R_1$ can be alkylene, alkyleneoxylakylene, poly(alkyleneoxyalkylene) or arylene, $n_1$ is an integer of at least one and $n_2$ is 0 or an integer of at least one. The total of $n_1$ and $n_2$ is such that the polymer normally has a molecular weight of more than about 10,000, usually at least about 20,000 and can be up to about 150,000 or higher. When $n_2$ is arylene then $n_1$ can be 0. Preferably, however, there are more $n_1$ units than $n_2$ units.

The polymers are prepared in conventional fashion by reacting phosgene with the appropriate dihydroxy compound or mixture of dihydroxy compounds.

Examples of suitable dihydroxy compounds for preparing the polycarbonates are bis (4-hydroxyphenyl)-cyclododecane, 1,1-di-(4-hydroxyphenyl)-ethane, 1,1-di-(4-hydroxyphenyl)-propane, 1,1-di-4-hydroxyphenyl)-butane, 1,1-di-(4-hydroxyphenyl)-2-methylpropane, 1,1-di-(4-hydroxyphenyl)-heptane, 1,1-di-(4-hydroxyphenyl)-1-phenylmethane, di-(4-hydroxyphenyl)-4-methylphenylmethane, di-(4-hydroxyphenyl)-4-ethylphenylmethane, di-(4-hydroxyphenyl)-4-isopropylphenylmethane, di-(4-hydroxyphenyl)-4-butylphenylmethane, di-(4-hydroxyphenyl)-benzylmethane, di-(4-hydroxyphenyl)- alpha-furylmethane, 2,2-di-(4-hydroxyphenyl)-octane, 2,2-di-(4-hydroxyphenyl)-nonane, di-(4-hydroxyphenyl)-1-alpha-furylethane, 1,1-di-(4-hydroxyphenyl)-cyclopentane, 2,2-di-

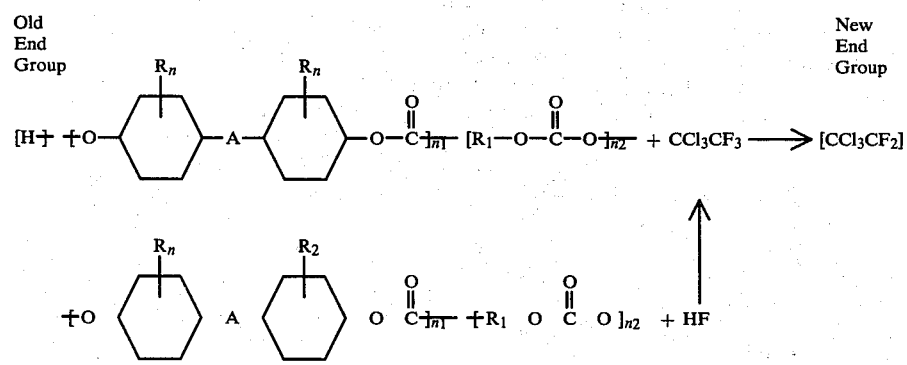

In the formulae R is an alkyl, cycloalkyl, aryl, or alkoxy group of halogen atoms, and n is an integer of from 0 to 4. Examples of alkyl radicals represented by R above having 1 to 10 carbon atoms, preferably from 1 to 5 carbon atoms, are methyl, ethyl, propyl, isopropyl, butyl, pentyl, hexyl, octyl, and decyl; aryl radicals such as phenyl, naphthyl, biphenyl, tolyl, xylyl, and so forth; aralkyl radicals such as benzyl, ethylphenyl, and so forth; cycloalkyl radicals such as cyclopentyl, cyclohexyl, and so forth; alkoxy radicals having from 1 to 5 carbon atoms, preferably from 1 to 3 carbon atoms are (4-hydroxyphenyl)-decahydronaphthalene, 2,2-di-(4-hydroxy-3-cyclohexylphenyl)-propane, 2,2-di-(4-hydroxy-5-isopropylphenyl)-butane, 1,1-di-(4-hydroxy-3-methylphenyl)-cyclohexane, 2,2-di-(4-hydroxy-3-butylphenyl)-propane, 2,2-di-(4-hydroxy-3-phenylphenyl)-propane, 2,2-di-(4-hydroxy-2-methylphenyl)-propane, 1,1-di-(4-hydroxy-3-methyl-6-butylphenyl)-butane, 1,1-di-(4-hydroxy-3-methyl-6-tert.-butylphenyl)-ethane, 1,1-di-(4-hydroxy-3-methyl-6-tert.-butylphenyl)-propane, 1,1-di-(4-hydroxy-3-methyl-6- tert.-butylphenyl)-butane, 1,1-di-(4-hydroxy-3-methyl-6-tert.-butylphenyl)-isobutane, 1,1-di-(4-hydroxy-3-methyl-6-tert.-butylphenyl)-heptane, 1,1-di-(4-hydroxy-3-methyl-6-tert.-butylphenyl)-1-phenylmethane, 1,1-di-(4-hydroxy-3-methyl-6-tert.-butylphenyl)-2-methyl-2-pentane, 1,1-di-(4-hydroxy-3-methyl-6-tert.-butylphenyl)-2-ethyl-2-hexane, 1,1-di-(4-hydroxy-3-methyl-6-tert.-amylphenyl)-butane, di-(4-hydroxyphenyl)-methane, 2,2-di-(4-hydroxyphenyl)-propane, 1,1-di-(4-hydroxyphenyl)-cyclohexane, 1,1-di-(4-hydroxy-3-methylphenyl)-cyclohexane, 1,1-di-(2-hydroxy-4-methylphenyl)-butane, 2,2-di-(2-hydroxy-4-tert.-butylphenyl)-propane, 1,1-di-(4-hydroxyphenyl)-1-phenylethane, 2,2-di-(4-hydroxyphenyl)-butane, 2,2-di-(4-hydroxyphenyl)-petane, 3,3-di-(4-hydroxyphenyl)-pentane, 2,2-di-(4-hydroxyphenyl)-hexane, 3,3-di-(4-hydroxyphenyl)-hexane, 2,2-di-(4-hydroxyphenyl)-4-methylpentane, 2,2-di-(4-hydroxyphenyl)-heptane, 4,4-di-(4-hydroxyphenyl)-heptane, 2,2-di-(4-hydroxyphenyl)-tridecane, 2,2-di-(4-hydroxy-3-methylphenyl)-propane, 2,2-di-(4-hydroxy-3-methyl-3'-isopropylphenyl-butane, 2,2-di-(3,5-dichloro-4-hydroxyphenyl)-propane, 2,2-di-(3,5-dibromo-4-hydroxyphenyl)-propane, di-(3-chloro-4-hydroxyphenyl)-methane, di-(2-hydroxy-5-fluorophenyl)-methane, di-(4hydroxyphenyl)-phenylmethane, 1,1-di-(4-hydroxyphenyl)-1-phenylethane, and the like.

Any suitable aliphatic dihydroxy compounds may be used such as, for example, ethylene glycol, diethylene glycol, triethylene glycol, polyethylene glycol, thioglycol, ethylene dithioglycol, 1,3-propane-diol, 1,3-butanediol, 1,4-butanediol, 1,3-(2-methyl)-propanediol, 1,5-pentanediol, 1,6-hexanediol, 1,8-octanediol, 1,1-decanediol and the like.

Any suitable cycloaliphatic dihydroxy compound may be used such as, for example, 1,4-cyclohexane-diol, 1,2-cyclohexane-diol, 2,2-(4,4'-dihydroxy-dicyclohexylene)-propane, and 2,6-dihydroxy-decahydro-naphthalene.

Examples of suitable aromatic dihydroxy compounds which may be employed are hydroquinone, resorcinol, pyrocatechol, 4,4'-dihydroxydiphenyl, 1,6-dihydroxynaphthalene, 2,6-dihydroxynaphthalene, 1,4-dihydroxynaphthalene, 1,5-dihydroxynaphthalene, dihydroxyanthracene, 2,2'-dihydroxydinaphthyl-1,1'-and o, m and p-hydroxybenzyl alcohol and the like.

In addition, di-(monohydroxyaryl)-sulfones may be employed such as, for example, di-(4-hydroxyphenyl)-sulfone, di-(2-hydroxyphenyl)-sulfone, di-(3-hydroxyphenyl)-sulfone, di-(4-hydroxy-2-methylphenyl)-sulfone, di-(4-hydroxy-3-methylphenyl)-sulfone, di-(2-hydroxy-4-methylphenyl)-sulfone, di-(4-hydroxy-2-ethylphenyl)-sulfone, di-(4-hydroxy-3-ethylphenyl)-sulfone, di-(4-hydroxy-2-tert.-butylphenyl)-sulfone, di-(4-hydroxy-3-tert.-butylphenyl)-sulfone, di-(2-hydroxy-1-naphthyl)-sulfone and the like.

The preferred polycarbonates are those made from either bisphenol A alone or a mixture of bisphenol A and bisphenol Cy. When the polycarbonates are made from a mixture of bisphenol Cy (or ring substituted bisphenol Cy) with bisphenol A (or other dihydric compound) the polycarbonate will have X repeating units from the bisphenol Cy and Y repeating units from the other dihydric compound (e.g., bisphenol A) in which the ratio of the units X:Y can vary widely, e.g., the ratio X:Y can vary from 5:95 to 95:5.

In addition to the phenolic hydroxy end groups, the polymer also can have the end group

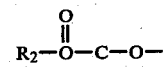

where $R_2$ is alkyl up to 4 carbon atoms, e.g., methyl, ethyl, propyl or butyl, cycloalkyl up to 6 carbon atoms, e.g., cyclopentyl or cyclohexyl, phenyl, alkylphenyl, e.g., p-tolyl, o-tolyl, p-ethylhexyl or p-butylphenyl, cycloalkyl phenyl, e.g., p-cyclohexyl-phenyl, phenylamino, etc.

Elimination of an end group hydrogen and capping the polycarbonate chain end wth a hydrophobic unit exemplifies one goal of the invention.

The preferred method for eliminating the vulnerable end unit hydrogen in the polycarbonate chain is to react dried polymer, produced as described above, e.g. in the manner described in the Wulff et al. U.S. Pat. No. 3,422,065, with suitable pressurized vapor such as halogenated organo silicon compounds during pelletizing extrusion operations. This reaction is facilitated by the high surface to volume ratio of the powder and flakes of the polycarbonates resin feed stock, the agitation and kneading provided by the action of th extruder feed screws, and by the elevated temperatures attendant the melt-in-process. The preferred point of vaporous reactant introduction (see FIG. 2) is near the melt plug of the extruder 100, Hydrogen chloride, HBr, or HF gas or other gas produced by the reaction is preferably vented to a water aspirator 102 connected to the upper portion of the reaction extruder at 104.

By choosing the intermediate chemical to have end capping and fluorescent functions, another goal of the invention may be realized. For instance, 0.5 to 1.0 weight percent trichlorodiphenyltriphenodioxazine may be added to polycarbonate during initial polymerization for purposes of producing a chemically bound fluorescent unit through labile hydrogen displacement.

The resulting 6,13-dichloro-3,10-diphenodioxazine unit has good stability and serves to convert incident U.V. radiation into longer wave length visible and infrared radiation. Other suitable fluorescent end caps include benzoxazole: produced by labile hydrogen chlorobenzoxazole silane.

The polymerization end cap addition of fluorescent units having about the same energy of formation as other polycarbonate units provides permanent U.V. and stress corrosion protection to the altered resin. U.V. energy is converted to visible and infrared energy. Stress corrosion is prevented because there are no enery-rich sites for chemical attack.

The vulnerable phenolic hydrogen on the polycarbonate can be reacted with other appropriate halogenated intermediates, especially where the halogens are fluorine, chlorine or bromine, as well as with silanes. Typical compounds are volatile halocarbons, halohydrocarbons, halosilanes, halohydrosilanes. There can also be employed silanes which are devoid of halogen. Examples of suitable reaction intermediates fo the types just described are set forth in Table 1.

TABLE 1
Reaction Intermediates

| Compound | | |
|---|---|---|
| 11 | methacryloxypropyltrimethoxysilane | $CH_2=C(CH_3)COO(CH_2)_3Si(OCH_3)_3$ |
| 12 | mercaptopropyltrimethoxysilane | $HSCH_2CH_2CH_2Si(OCH_3)_3$ |
| 13 | glycidoxypropyltrimethoxysilane | $\overset{O}{CH_2CHCH_2}O(CH_2)_3Si(OCH_3)_3$ |
| 14 | aminopropyltriethoxysilane | $H_2NCH_2CH_2CH_2Si(OC_2H_5)_3$ |
| 36 | carbon tetrachloride | $CCl_4$ |
| 15 | trichlorofluoromethane | $CCl_3F$ |
| 16 | dichlorodifluoromethane | $CCl_2F_2$ |
| 17 | chlorotrifluoromethane | $CClF_3$ |
| 18 | bromotrifluoromethane | $CBrF_3$ |
| 35 | carbontetrafluoride | $CF_4$ |
| 19 | chloroform | $CHCl_3$ |
| 20 | dichlorofluoromethane | $CHCl_2F_2$ |
| 21 | chlorofluoromethane | $CH_2ClF$ |
| 22 | methylene fluoride | $CH_2F_2$ |
| 23 | 1,1,2,2-tetrachloro-1,2-difluoroethane | $CCl_2FCCl_2F$ |
| 24 | 1,1,1,2-tetrachloro-2,2-difluoroethane | $CCl_3CClF_2$ |
| 25 | 1,1,2-trichloro-1,2,2,-trifluoroethane | $CCl_3FCClF_2$ |
| 26 | 1,1,1-trichloro-2,2,2-trifluoroethane | $CCl_3CF_3$ |
| 27 | 1,2-dichlorohexafluorocyclobutane | $C_4Cl_2F_6$ |
| 28 | chloroheptafluorocyclobutane | $C_4ClF_7$ |
| 29 | octafluorocyclobutane | $C_4F_8$ |
| 5 | chloromethyldimethylchlorosilane | $ClCH_2(CH_3)SiCl$ |
| 1 | trimethylchlorosilane | $(CH_3)_3SiCl$ |
| 3 | trichloromethylsilane | $CH_3SiCl_3$ |
| 2 | silicon tetrafluoride | $SiF_4$ |
| 30 | silicon tetrachloride | $SiCl_4$ |
| 31 | hydrasilicontrifluoride | $HSiF_3$ |
| 6 | hydrasilicontrichloride | $HSiCl_3$ |
| 32 | disilicon hexafluoride | $Si_2F_6$ |
| 33 | disilicon hexachloride | $Si_2Cl_6$ |
| 34 | tetrasilicon decafluoride | $Si_4F_{10}$ |
| 7 | silicon fluorochlorodibromide | $SiFClBr_2$ |
| 8 | methyl trichlorosilane | $(CH_3)SiCl_3$ |
| 37 | dimethyl dichlorosilane | $(CH_3)_2SiCl_2$ |
| 9 | trimethyl bromosilane | $(CH_3)_3SiBr$ |
| 4 | triethylchlorosilane | $(CH_2H_5)SiCl$ |
| 10 | hexaethyldisilane | $(C_2H_5)_6Si_2$ |
| 38 | fluoroform | $CHF_3OCH_3$ |
| 39 | acryloxypropyltrimethoxysilane | $CH_2=CHCH_2OCH_2CH_2CH_2-Si\ OCH_3$ |

TABLE 2

| Compound | Fluorescent Reaction Intermediates |
|---|---|
| 41 | 6,13-trichloro-3-10-diphenyl-triphenodioxazine |
| 40 | fluorodichlorodiphenyltriphenodioxazine |
| 44 | quinine chlorosulfate |
| 46 | 3-aminochlorophthalimide |
| 45 | n-nitrochlorodimethylaniline |
| 43 | aluminum chelate of 2,2'-dihydroxy-1-1'azonaphthalene-4-sulfonic acid |
| 47 | 4-dimethylchloroamino-4-nitrostilbene |
| 48 | Rhodamine B-chlorosilane |
| 49 | Magdela Red Chlorosilane |
| 42 | Zinc trimethylsulfide |
| 50 | Zinc dialkyl dithiocarbamates |
| 52 | 4-(4-Nitrophenylazo) chlorophenol |
| 53 | Zinc ethyl xanthate |
| 54 | Zinc fluoromethylsilane |
| 59 | Zinc ethyldichloroformate |
| 57 | Zinc isopropyldichloroformate |
| 56 | Zinc phenyldichloroformate |
| 58 | Zinc 1; 4 cyclohexanediol bischloroformate |
| 65 | Rhodamine 110 |
| 66 | Rhodamine 19 Perchlorate |
| 67 | Zinc Xanthene |
| 68 | Silicon Xanthene |
| 70 | Rhodamine 123 |
| 72 | 1-Naphthoyl Chloride |

TABLE 2-continued

| Compound | Fluorescent Reaction Intermediates |
|---|---|
| 55 | Zinc benzoyldichloride |
| 60 | Zinc phenylchlorocarbonate |
| 61 | Rubrene chloride |
| 62 | Sodium Fluorescein |
| 63 | Rhodamine B |
| 63 | Rhodamine B. Perchlorate |

It should be realized that Table 1 and Table 2 are illustrative only and the reactive intermediates are not limited thereto.

The amount of fluid reactant for replacing the phenolic hydrogen is not critical. There should be enough employed to remove all of the phenolic hydrogen atoms to provide the hydrophobic end unit but an excess of the fluid reactant can be employed.

Referring for the moment to previous Equations 1 through 8, as has just been pointed out, upon reaching the desired molecular weight, the polymerization is terminated by addition of an end cap intermediate selected from Table 1 or Table 2 to produce desired chemical and physical properties.

This end capping reaction is typified as shown in Equation 9.

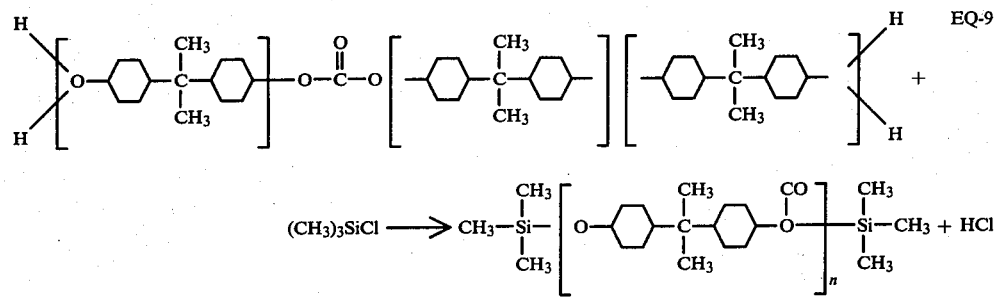

Polymer produced by the above set out technique may be separated from the oslvent by evaporation whereupon a clear film of tough stress corrosion resistant polycarbonate is cast. This film may be cast upon selected usbstrates to produce laminates or spray cast upon silicone or fluorocarbon traps, conveyers, or wheels that allow peeling or shedding away the dry film for chopping and thermoplastic processing into film, sheet tube and profiles.

BRIEF DESCRIPTION OF THE DRAWINGS

The invention will be understood best in connection with the drawings wherein:

FIG. 1 shows vertical plasticizing extruder for carrying out the process of the invention;

FIG. 2 shows the screw and barrel assembly of the extruder of FIG. 1;

FIG. 6 is a diagrammatic illustration of a system for producing carbon monoxide; and FIG. 7 is a diagrammatic illustration of a reactor used in the system of FIG. 6.

DESCRIPTION OF THE PREFERRED EMBODIMENTS

Figure 3:
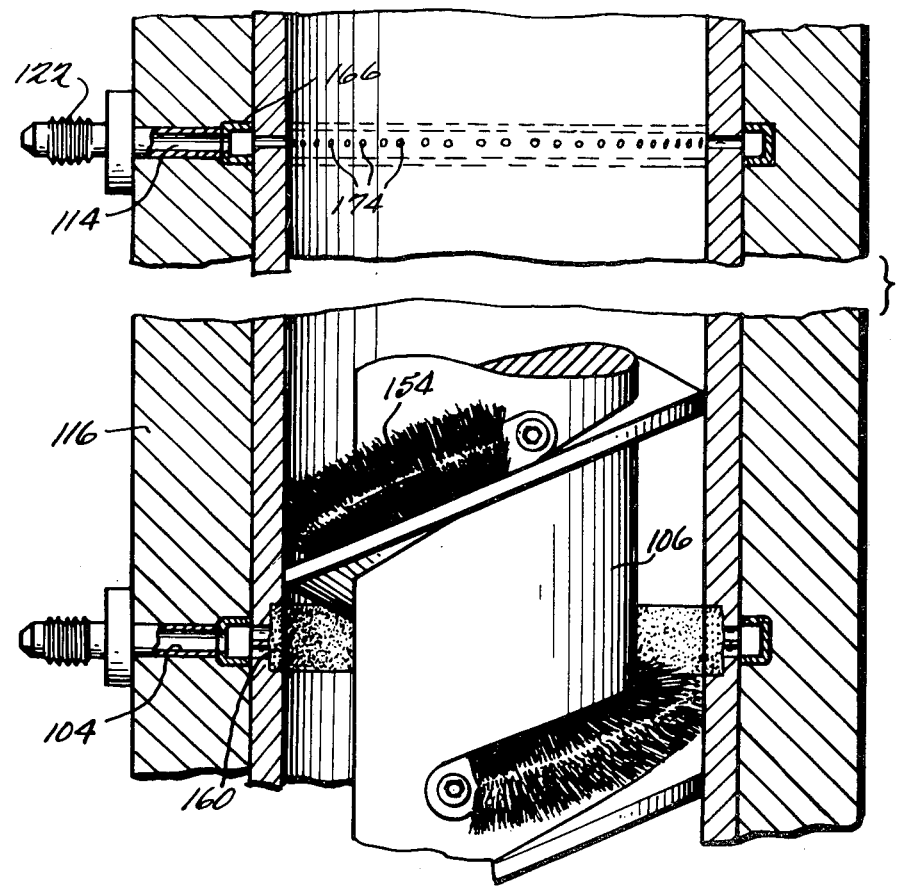
FIG. 3 illustrates details of the vent and port of the extruder.

As shown in FIG. 1, the polymer conversion objects of the invention may be realized with the aid of a plasticizing extruder. In operation, feed polycarbonate resin, usually in the form of powder granules, flakes, or pellets is loaded by a suitable means such as vacuum loader 4 into drying hopper 5. Resin entered into hopper 5 is held in residence until dry. This is usually accomplished by circulation of 250° F. dessicant dried −60° F. dew pooint air for resin exposures of 2 to 4 hours. Resins is then continuously fed by a double lead extension (not shown) of screw 106 that extends about 12" into the bottom zone of hopper 5. Resin at about 250° F. entering the upper zone (ZONE 1) of the 3½" 30/1 L/D extruder is controllably further heated to between 300° F. and 450 F. by suitable sources such as electric resistance band heaters, circulating hot oil heaters, or steam jacket heaters. A vaporous reactant such as any of those set forth in Table 1 are delivered under suitable pressure from source container 108 to pressure regulator 110 and through line 112 to extruder barrel 116 at a entry 114. Entry port 114 is suitably an annular ring ⅜" wide×¼" deep machined into the inside diameter or bore of the outer shell of extruder barrel 116 at about 24" below the entry to barrel 116. This distributor port ring is covered by barrel inner liner of wear-resistant material selection typically no more than ¼" in thickness. Small diameter (preferably 0.030" max.)holes spaced at ¼" circumferential intervals in the wear-resistant inner liner tube thus communicate the vapors delivered from 112 to the resin mass within the extruder.

The reactant vapors are delivered under sufficient prssure to flow into the compressed but non-fused resin mass and travel in both axial directions, toward the resin entry and toward the extruder output. Vapor entrainment into the resin mass is assured by the kneading action of screw 106. It is preferred to cause entering resins within the feed section to be more tightly compressed than at the first transition section. This is accomplished by utilizing a double screw flight design within the feed section followed by a single scrwew flight design through the first transition and remaining screw sections. The entry zone for reactant vapors therefore, is preferalby at a point below more tightly compacted resin and above a resin fusion point. As shown, the extruder screw flight depth is preferably gradually diminished through the transition zone to a first meter zone. Melt fusion of the resin at the lower portion of the first meter zone is maintained by control of th heater band setting in the first meter zone in conjuction with the screw rpm. Vapors entering barrel assembly 116 through port ring 114 are immediately reacted with resin surfaces and continue to react as the resin and entrained vapors are recompressed and resin melting occurs. Venting of by-product vapors such as HCl, HBr, and other volatiles through vent ring 104 is preferably at a point where approximately 60% to 80% of the resin mass has fused. Vent 104 is preferably an annular gap ⅜" wide×14" deep machined in the inside diameter outer shell of barrel assembly 116 about 56" below the top of the barrel. This ring is fitted wth a porous sintered particle type 310 stainless steel cylinder treated with polytetrafluoroethylene for the purpose of allowing non-plugging venting of unreacted vapors and by-product vapors to a suitable disposal facility. Vaporous effluent from 104 is delivered under developed pressure or to a suitable pump 102. This pump may be a water seal vacuum pump such as a NASH ½ HP or a water aspirator of common design. Hydrogen halide vapors and resulting acids produced by the above-described reactions are then neutralized by suitable bases such as sodium hydroxide or other low cost alkaline mediums in sump 120.

Plastic resin masses achieving 100% fusion in the first melting zone continue to be worked by the action of screw 106 and undergo thorough homogenization through second transition and second meter zones of the extruder before exiting as completely reacted, homogeneous, stress corrosion and ultraviolet radiation resistant thermoplastic suitable for forming by dies into any desirable shape.

Preparatyion of stress corrosion resistant polymers may be more desirable for some products than preparation of combined ultraviolet and stress corrosion resistant polymers. Selection of reactants from Table 1 offers a wide variety of final properties in addition to improved stress corrosion resistance. For instance, extruded sheet and film products made from Compounds 11, 12, 13, 14 (Table 1) vapor reacted polycarbonate has enhanced adhesion to printing inks without the need for conventional primers, corona discharge, or flame treatments. Hot melt resin products made from polycarbonate resin so treated develop improved adhesion to all polyesters and thus offer an important improvement to weld joining techniques.

By using Compounds 2, 15, 16, 17, 18, 20, 21, 22, 23, 24, 25, 26, 27, 28, 29, 32, and 35 (Table 1), the resulting stress corrosion resistant polycarbonate is particularly grease and water repellant and thus suited for food service, home finishing, and similar applications requiring antisoiling and low adhesion qualities. Products may be injection molded, fabricated sheet-like forms, or made from fiberous embodiments and retain desired antisoiling properties.

Somewhat more economical achievement of greatly improved stress corrosion resistance and for some applications a desirable degree of hydrophobicity follows treatment using Compounds 1, 3, 4, 5, 8, 9, 10 and 37 (Table 1) reactant vapors.

The vapor reactants cited above for purposes of producing improved stress corrosion and ultraviolet resins vary greattly in chemical reactivity. This is particularly true with respect to the agitation, smearing, and kneading of the reactants at elevated temperatures as provided by the extruder. Thus it has been found useful in some cases to dilute the vapors with an inert carrier gas such as carbon dioxide, nitrogen, argon, or dry air for purposes of preventing explosive rates of reaction during introduction to the barrel at entry pressures sufficient to overcome locally existent resin pressures.

For instance, a mixture of 2% to 5%, e.g., 3.5%, trimethylchlorosilane in 95% to 98%, e.g. 96.5%, nitrogen (by volume) at an entry pressure of 5 to 7, e.g., 6, atmospheres at 114 and 10 to 20 atmospheres at 126 provides complete conversion of conventional bisphenol A based on polycarbonate to stress corrosion resistant resin in a Type 430 outer tube, Type 431 hardened inner liner, Type 431 hardened and chrome plated screw, 3½" diameter 30/1 L/D ratio extruder. Nitrogen, hydrogen chloride gas, and unreacted excess trimethylchlorosilane pass through vent 104 to disposal or recovery sink 120.

FIG. 3 illustrates details of vent 104 and port 114. (Port 126 is typical to port 114.) Braze sealed ⪆" AN type tube fitting 172 is sufficiently large enough for adding reactant vapors to ⅜" wide×¼" deep annular ring 166. Forty-four radially oriented 0.028" diameter holes 174 provide communication of entering vapors to the barrel as shown.

Vent 104 utilizes a stainless screen mesh or porous sintered Type 310 stainless steel ring 160 to pass fluid vapors and gases while filtering solid resin particles and flakes. The screen structure 160 is preferably 250×250 mesh, ½" wide, spiraled 4 to 6 layers and seam welded at each end. A stiff bristled stainless steel brush 154 is attached to screw 106 as shown. In operation, the wire mesh filter cylinder 160 is continually wiped clean by helically formed brush 154 which is attached to and empowered by screw 106.

The present invention further includes the development of uniform unit site free energies of formation in polycarbonate resins through the facility of liquid phase reactions. For example, bisphenol A feed stocks, e.g., bisphenol A, may be dissolved in a suitable solvent such as ethylene chloride, methylene chloride, petrol, ligroin, cyclohexane, methylcyclohexane benzene, toluene, xylene, chloroform, carbontetrachloride, trichloroethylene, dichloroethylene, methyl acetate, and ethyl acetate and reacted with phosgene to produce polycarbonate. This reaction may, for purposes of maintaining desired reaction rates be developed in an aqueous atmosphere and controlled by various additions and catalysts and pH modifiers as is conventional in the art. Replacement of non-uniform free energy of formation end units and labile hydrogen may be accomplished in the separated non-aqueous liquid phase by addition of reactants selected from Table 1.

As an illustration of the liquid phase reaction, a mixture including 10.8 lbs. bisphenol A, 4.7 lbs. sodium hydroxide, 22.4 lbs. methylene chloride, and 62.1 lbs. distilled water is agitated to a slurry suspension and slowly phosgenated with about 4.9 lbs. phosgene. About 0.36 lbs. of 4% solution of triethylamine is then added and the slurry is agitated for about two hours or until the desired molecular weight is reached. Additional methylene chloride may be added to reduce the viscosity of the organic phase to facilitate washing with hydrochloric acid and then with dionized water until neutral.

Phosgenation accelerated by the sodium hydroxide basic aqueous atmosphere thus produces polycarbonate in solution in methylene chloride the polycarbonate having the general formula:

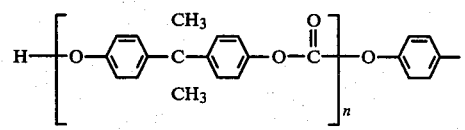

This solution and any water present may be dried by any suitable means or evaporated completely to produce dry, clear, polycarbonate film, and redissolved in dry methylene chloride.

The polycarbonate in solution in dry methylene chloride or other suitable solvent, e.g. a 15 to 60% by weight solution in methylene chloride may be reacted with a compound from Table 1, e.g., 0.01 to 5% of the compound by weight of the polycarbonate resin, to produce stress corrosion resistant polycarbonate as follows.

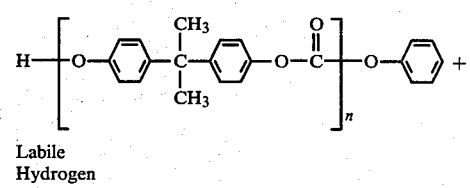

Labile Hydrogen

-continued

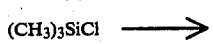

Reactant

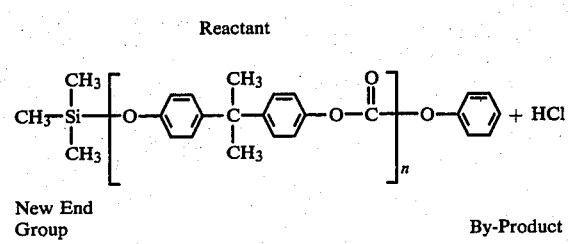

New End Group       By-Product

The reaction can take place at 30° F. to 200° F. with the compound of Table 1 in gaseous form.

Removal of the hydrogen chloride or other similar by-product may be by aqueous neutralization washing followed by evaporative redrying, or through evaporation of the methylene chloride and venting of the HCl vapors during melting of the resulting resin.

Phosgenation and modification of high free energy unit sites may also be carried out without the aid of water slurry atmospheres. Bisphenol A dissolved in suitable dry solvents such a dimethyl sulfoxide ($CH_3SOCH_3$), methylene chloride ($CH_2Cl_2$), or ethylene dichloride ($C_2H_4Cl_2$), in sufficiently dilute concentration to control reaction rates and resulting viscosity increases corresponding to molecular weight growth upon phosgenation provides a suitable atmosphere for reacting the newly polymerized polycarbonate with a Table 1 reactant selected for specifically desired resulting properties. The condensation reaction may be terminated upon desired molecular growth by addition of dry ammonia or hydrogen gas followed by an end group reactant selected from Table 1.

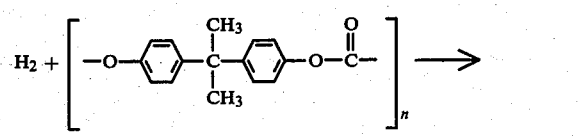

For example:

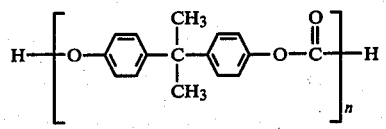

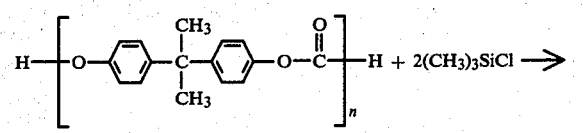

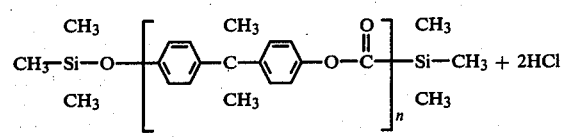

The resulting polymer illustrated has uniform unit site free energies of formation and increased hydrophobicity at the end caps. Other properties as discussed above may be achieved corresponding to the reactant selected from Table 1.

Preparation of the polymer for thermoplastic processing such as injection molding or extrusion involves separation of the by-products HCl and NaCl, and evaporative recovery of the solvent. NaCl precipitate may be filtered or centrifugally separated. It is preferred to recover the HCl as a valuable by-product for sale.

Figure 4:
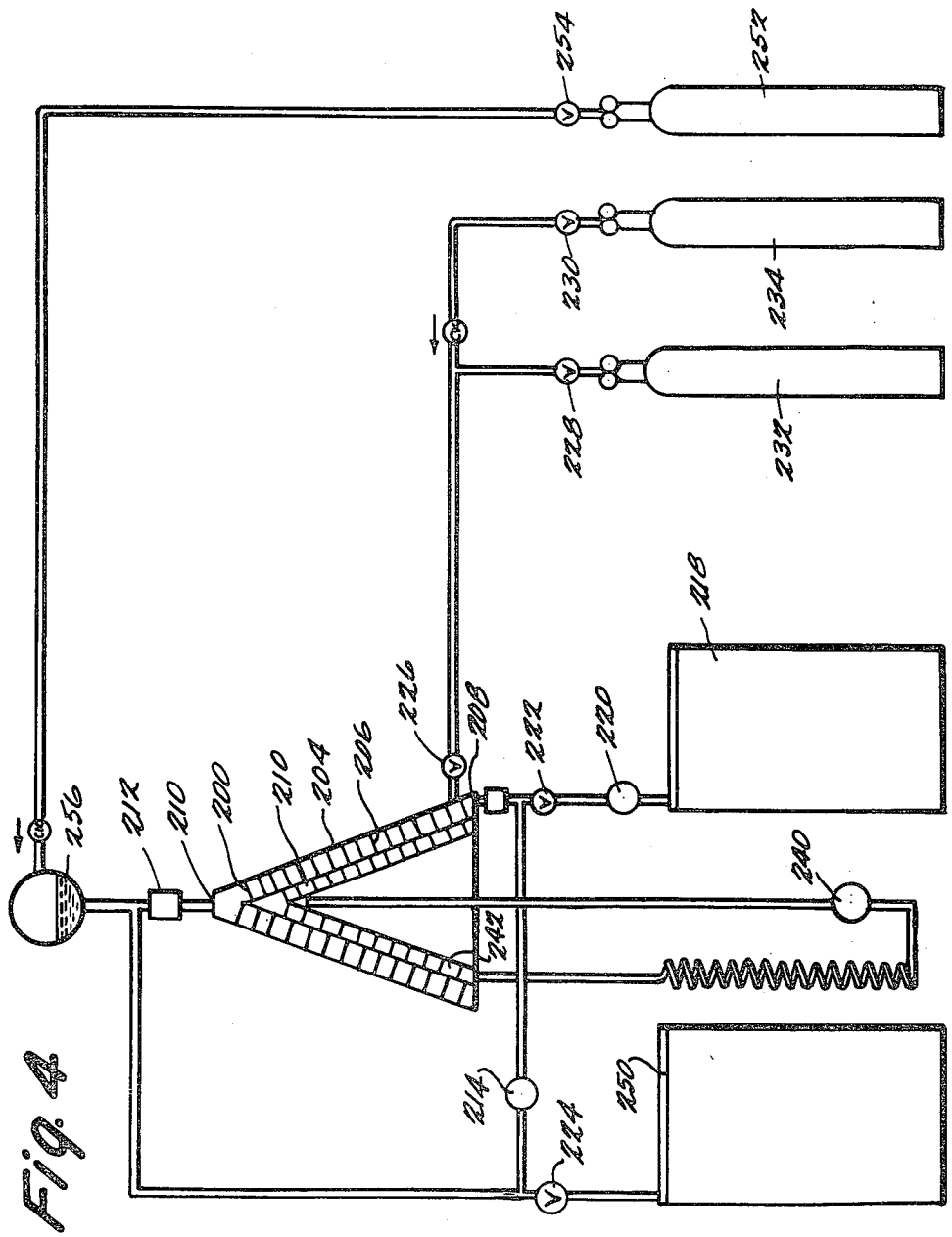
FIG. 4 is a diagrammatic illustration of a polycarbonate polymerization unit.

One of the preferred mechanical embodiments for polymerizing the polycarbonate unit to the desired molecular weight is illustrated in FIG. 4. A coniform Type 310 stainless steel helical spiral 200 is brazed to an inside Type 310 stainless steel conical form 202 and to an outside type 310 stainless steel conical form 204. The resulting tubular path 206 is a coniform spiral starting at 210 and ending at 208. Attached to the inlet 210 is a suitable tube connection 212 to pump 214, and attached to the outlet is a suitable tube connection 216, to form a circulation loop as shown involving the conical spiral and pump 214.

Selected solvent, e.g., methyl chloride, 600 parts by weight, and bisphenol A 230 parts by weight, in solution is pumped into the aforesaid pump 214 circuit by pump 220 from reservoir 218. Upon filling the pump 214 circuit, valves 222 and 224 are closed. Upon establishment of a steady state rate of circulation of the bisphenol A in solvent solution through the pump 214 circuit, 110 parts by weight of phosgene ($COCl_2$) is admitted through valves 228 and 226 into the spiral portion as shown. The reaction is carried out at 90° F.

The buoyant upward force developed by the reactant phosgene gas is somewhat countered by the fluid motion forces of the bisphenol solvent solution that flows countercurrent to the phosgene's upward spiral. This insures high exposure of the phosgene to the bisphenol A solvent solution.

Control of the reaction rate is offered by the rate of phosgene addition, the rate of circulation, and the reaction temperature. Optimum reaction temperature is maintained by heat exchange through pump circuit 240 which is connected to a similar subspiral 242 constructed as 206 but preferably circulated with hot or cold water.

Upon completion of the reaction and development of the desired molecular weight, e.g., after six hours, the polymerization is terminated by addition of pressurized hydrogen through valves 226 and 230. The inventory of solvent, and polycarbonate with hydrogen end groups is now transferred to reservoir 250. Replacement of fluids drained to 250 is by an inert gas such as argon, $CO_2$, or the like, as supplied from pressure cylinder 252 through valve 254 to accumulator 256.

Fluid stored in 250 may then be centrifugally filtered to remove NaCl precipitate and recirculated through a similar loop as described above to replace the hydrogen end caps with more desirable units as previously described by reaction with chemicals selected from Table 1, e.g., using trimethylchlorosilane at a temperature of 90° F.

Figure 5:
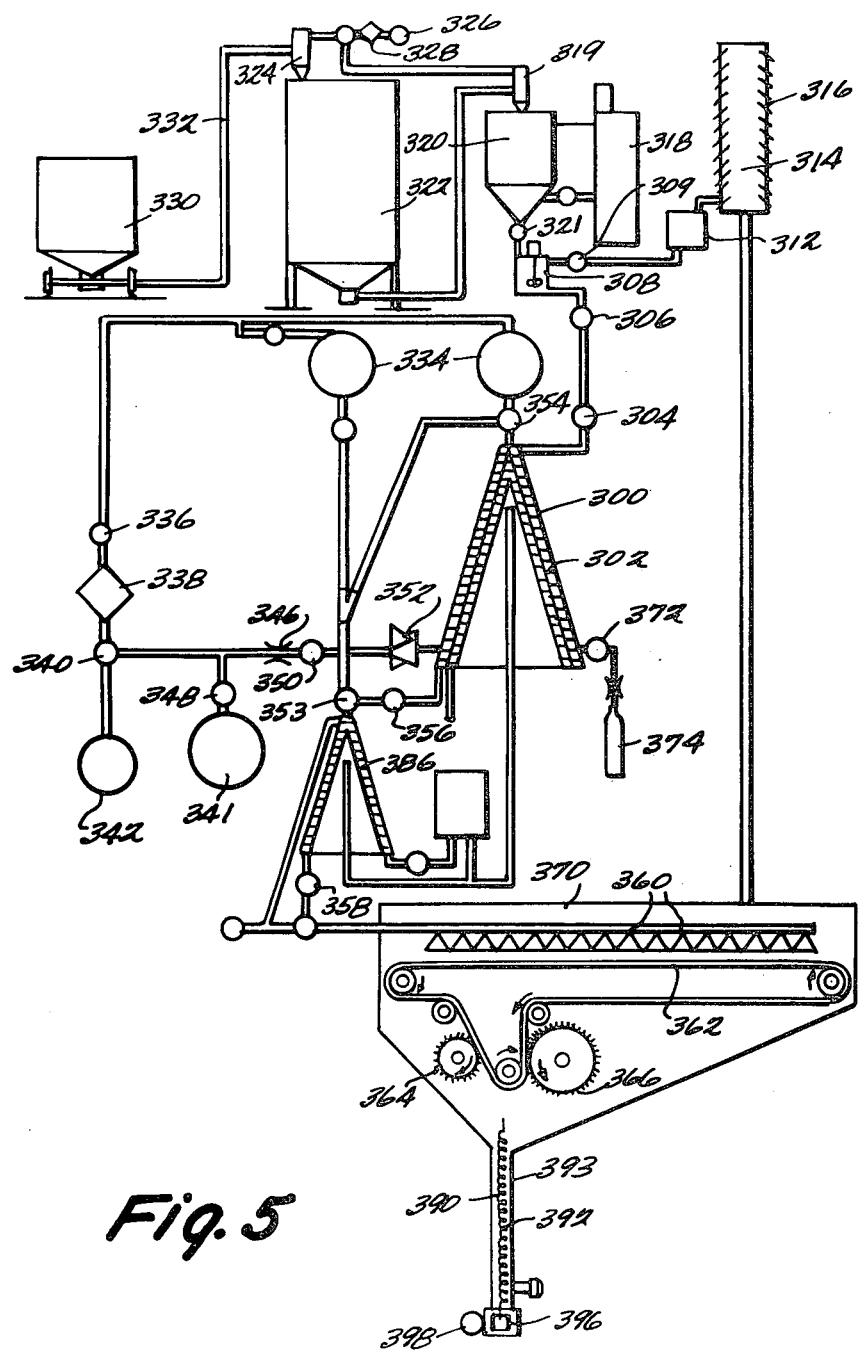
FIG. 5 is a diagrammatic illustration of a system for polymerizing polycarbonate.

Referring to FIG. 5, the system starts with unloading bisphenol A powder from railcar 330 through suitable line 332 to cyclone separator 324. 324 is empowered by a suitable high-volume air pump 326. Dust is collected in filter 328. Bulk storage of bisphenol A is provided in silo 322. Delivery through tube 332 to cyclone separator 319 and drier-hopper 320 is empowered by pump 326 or a similar pump. Dessicant dryer 318 provides rapidly circulated −60° F. dew point, 250° F. air for an average dwell time of two hours to dry powder in 320. Thoroughly dried, clean bisphenol A is added through valve 321 to reservoir 308 where it is dissolved in a suitable solvent such as dimethylsulfoxide added through valve 309. The solution is passed through pump 306 and valve 304 to reactor 300. Reactor 300 is preferably constructed of 300 series stainless steel according to a design previously described with respect to reactor 204. Circulation of the dissolved bisphenol A and solvent is provided by pump 356 through 3-way valves 353 and 354 to spiral path 302 within reactor 300. Hydrogen is added through valve 340, pressure regulator 346 and valve 350 after being activated at 352. Activation of hydrogen by heating and development of increased energy states upon passage through an electrical arc in 352 decreases the required temperature of the solution circulated through 300. Hydrogen is added until the total pressure is about 250 psi. Variable displacement pump 356 is operated so as to produce high shear flow of the bisphenol A solvent solution through 300 as hydrogen is added. Valve 348 is then closed and carbon monoxide is admitted from 341 through valves 348 and 350 to reactor 300. Hydrogen is released from the bisphenol A-hydrogen intermediate as carbonate radicals are formed and link bisphenol units into polycarbonate polymer. Displaced hydrogen is collected in separator 334 as the solution in reactor 300 is continually circulated until the desired molecular weight is reached. Hydrogen collected in separator 334 is then pumped by compressor 336, through filter 338, valve 340, into storage as a compressed gas in 342. Upon reaching the desired molecular weight, the polymer is end-capped by admitting a suitable reactant, selected from Table 1 or Table 2 through valve 372 from reservoir 374. Polycarbonate polymer of the desired molecular weight in solution is diverted through valve 353 to high pressure pump 358. Reactor 386, of a construction similar to 300, may be employed to heat the polycarbonate-solvent solution under pressure to a temperature well in excess of the atmospheric pressure boiling point of the solvent. High pressure solutions of polycarbonate and solvent are sprayed through suitable nozzles 360 on extended surface conveyor 362. Chamber 370 is operated at total pressure below the partial pressure of the selected solvent and immediate evaporation of the solvent is achieved. Solvent vapors are condensed in condenser 314. Condensed liquid solvent is stored in reservoir 312. Polycarbonate which is deposited on conveyor 362 is displaced by rotary brooms 364 and 366. Flakes of polycarbonate are pelletized for handling, shipping, and further use efficiencies by extruder 392.

Bisphenol A resin in granular powder form is handled by conventional chemical plant equipment including a suitable silo 322, hopper dryer 320, dessicant type air dryer 318 and mixer 308. The selected solvent is condensed and handled by conventional chemical plant equipment, including a properly selected condenser tower 316, tank 312, valve 309, and mixer 308.

Bisphenol A dissolved in the selected solvent, e.g. methylene chloride, is circulated through conventional pump 306 and valve 304 to reactor 300. Reactor 300 may be of any suitable conventional design but is preferably built for purposes of producing extremely high surface to volume ratio flows of fluids and balancing high buoyant forces of reactant gas additions with viscous forces of countercurrent flowing liquid fluids. In large-scale production, it is believed that a stainless steel, aluminum or titanium alloy tube coil surrounded with a suitable temperature control bath wound produce an economical reaction path. For instance, a 600-foot long, Type 316, one-inch diameter stainless steel tube housed within a 600-foot long 1¼" diameter Type 316 stainless steel coaxial tube coiled on a vertical axis cylindrical or conical support and fitted at each end with conventional Type 316 stainless steel coaxial braze fittings enables close temperature control from fluid such as water or silicone fluid circulated in the O.D. tube. Circulation and conversion of more than 14,000 gallons of bisphenol A-solvent solution (e.g. using methylene chloride as the solvent) to 14,000 gallons of polycarbonate-solvent solution per day may be practically achieved. This enables about 600,000 pounds of low-cost, improved stress corrosion resistant polycarbonate per year to be produced by the subject invention.

Polymerization of the polycarbonate to desired molecular weights followed by end-capping and spray drying in 370 may also be accomplished at considerable savings compared to conventional plant equipment. Pressurization by pump 358 of the heated polycarbonate-solvent solution to 20 atmospheres pressure enables extremely fine sprays to be developed in airless spray nozzles 360.

Polymerized polycarbonate-solvent solutions sprayed from 360 may be aimed away from, parallel to, or at moving conveyor 362. Preferably the belting of this conveyor is comprised of fluorocarbon material manufactured as a coarse plush, velvet-like rug, similar to some artificial turf materials. Extremely high surface areas expose drying polycarbonate films that are formed on the surface of the fluorocarbon velvet hairs.

Dried polycarbonate films are to a large extent deposited on the outer tips of the conveyor material. Upon reaching rotary broom 364, these deposits are whisked off of the conveyor surfaces and fall into the hopper around extruder screw extension 390. Rotary broom 364 is operated at considerably higher tangential velocities than the conveyor surface. Another rotary broom 366 preferably operating at tangential velocities above that of the conveyor provides pick-up and cleaning of surfaces laid down by the action of 364. The continuous conveyor is then routed as shown, back to the spray line for facilitating the separation of polycarbonate and solvent.

Extruder 392 consists of a vented barrel 393, a screw 390, a gear reduction unit 396, and a drive motor 398. For the plant schematically illustrated in FIG. 5, the components are sized as shown in Table 3.

TABLE 3

| Pilot Plant Example | | | |
|---|---|---|---|
| Component Number | Component Name | Capacity | Specification |
| 332 | Transfer tube | 2½ dia. | Aluminum tubing, polybutene sweeps |
| 324 | Cyclone separator | 1,500 lb/hr | Epoxy coat interior surfaces |
| 326–328 | Bag filter assay | 100 lb/hr | Recyclable bag type |
| 322 | Storage silo | 200,000 lb | Welded construction, epoxy lined |
| 320 | Dryer hopper | 1,000 lb | Insulated for 360° F. service |
| 318 | Dessicant | 1,500 GPM | −60° F. dew point; 250° air |
| 324 | Solvent condenser | 80,000 lb/day | Stainless steel |
| 312 | Holding tank | 1,500 gal | Stainless steel |
| 308 | Mixing tank | 1,500 gal | 25 HP totally enclosed motor drive, stainless steel |
| 306 | Transfer pump | 200 GPM 10 PSIG | Stainless wetted components |

TABLE 3-continued
Pilot Plant Example

| Component Number | Component Name | Capacity | Specification |
|---|---|---|---|
| 304-309-253-254-359 | Flow control valves | 200 GPM, 3,000 PSIG | Stainless wetted components solenoid operated |
| 336 | Hydrogen compressor | 3,000 PSIG, 3 stage | 10 HP totally enclosed |
| 342 | Hydrogen storage | 3,000 PSIG | Stainless steel |
| 341 | Carbon monoxide production and storage | 3,000 lb/day | Incomplete combustion of carbon with oxygen |
| 340-349-350 | Gas control valves | 3,000 PSI | Stainless steel |
| 335-333-372 | | 1,000 GPM | solenoid operated |
| 346 | Pressure regulator | 0-3000 PSI 1,000 GPM | Rated for CO, $H_2$ with downstream check valve |
| 334 | Hydrogen separator tanks | 500 PSI 1,000 GPM | |
| 300 | Reactor | 100 GPM, 500 PSI, 400° F. | Coaxial 1" bore and 1¼" bore stainless steel tubes; 600' long |
| 388 | Heat exchanger | 100 GPM 3,000 PSI 500° F. | Coaxial 1" bore and 1¼" bore stainless steel tubes; 300' long |
| 358 | Solution pump | 100 GPM 3,000 PSI 500° F. | Stainless wetted components, carbon and ceramic seals |
| 370 | Hermetically sealed spray hopper | 6' × 75' conveyor with totally enclosed 20 HP variable speed motor drive | Stainless steel liner, insulated for 250° F. operation |
| 393 | Pelletizer | 4" dia. 30/1; L/D vented extruder, 100 HP | Variable speed drive |
| 380 | Fluid heater/cooler | 50 GPM 5° F. to 500° F. silicone oil; heater or cooler, 50 PSI | |

Carbon monoxide is preferably produced at the suite of use by excess carbon to oxygen combustion in a fluidized bed of relatively pure carbon. FIG. 6 illustrates the preferred embodiment for carbon monoxide production. Carbon delivered by any suitable means, including railcar 450 is conveyed to storage silo 468 by suitable transfer and grinding equipment including tubing 452, cyclone separator 454, hammer mill 460, cyclone separator 462, filter bag 464, and blower 466. Carbon particles ranging from dust to pea-sized modules stored in 468 are transferred to dryer hopper 478 and into fluidized column 496 by screw 484. Hardened 4140 steel screw 482 is preferably designed with a compression ratio of about 3/1; a screw diameter of 3", and an L/D ratio of about 15 for purposes of compacting the carbon particles moving through transfer barrel 482, to form a seal against the flow of carbon monoxide produced in reactor 496.

Carbon monoxide is produced in reactor 496 by the combustion of carbon with oxygen that may be supplied from any economical source. The surface reaction starts on porous silicon carbide cone 499 through with oxygen passes and combines with carbon supplied from the fluidized bed to form carbon monoxide. Cone 499 is housed in reaction box 498, detailed more fully in FIG. 7.

$$1\tfrac{1}{2}O_2 + 2C \rightarrow CO + CO_2$$

Start-up requires electrical resistance heating cone 499 to 1,500° F. or more. Cone 499 is maintained between 1,800° F. and 0° F. by control of the rate of oxygen addition through regulation of the oxygen pressure by regulator 500. Little carbon dioxide is produced however, any carbon dioxide present on the surface of 499 is reacted with orange-white hot carbon in 496 to produce carbon monoxide.

$$CO_2 + X \rightarrow 2CO$$

The carbon monoxide production is exothermic and once started, continues at rates dependent upon the oxygen pressure. Heat produced by the reaction is carried upward within insulated reactor 496 to preheat carbon working down to the reaction cone. Reactor 496 has a bore of 12", a height of 15", and is lined with a 0.250 wall Type 310 stainless steel tube. Carbon monoxide at about 250° F. is filtered through sintered stainless steel shot filter 490 and is supplied at about 500 psi to storage 341 for polycarbonate manufacture.

As shown in FIG. 7, stainless steel tube 496 is preferably welded to adapter flange 516. Adapter flange 516 is a 1" thick Type 310 stainless plate and provides transfer of the column load of 496 to insulative bricks 521. 516 also supports Type 304 stainless steel cup 523 which is sealed against 516 by a copper gasket and 12 equally spaced ½-13 TPI screws 525. Cup 523 provides support for porcelain insulator 530. Insulator 530 electrically isolates heat resisting compression spring 528 that thrusts porcelain adapter cup 526 and silicon carbide resistant element 512 upward into tapered hole 510 of cone 499 to assure good electrical contact through all temperatures of operation. Cooling coil 532 provides circulation of suitable cooling fluids such as silicone oil to limit the temperature of the cylindrical walls of cup 523 to about 400° F. Considerable cooling is provided by the incoming oxygen, however, on start-up and shut-down conditions, 523 requires additional heat dissipation through 532.

Start-up is provided by establishing a low positive pressure of oxygen through 524, and applying alternating 25 V, 300 A current through the circuit 544, 542, 522, 512, 499, 516, and 546. Resistor element 512 presents the most thermally insulated, highest resistance portion of the circuit and reaches 2400°-2800° C. and heats 499 to at least 1500° F. by conduction and radiation. After carbon monoxide production is detected at 486, electrical resistance heating may be stopped. Gas tight sealing 499 to 516 is provided by conductive graphite electrode tar 518.

Shut-down is simply accomplished by stopping the flow of oxygen through 524. Ash forming impurities in the carbon selected for carbon monoxide production eventually build a slag over 518 and in long production runs may be removed by hot tapping through removable plug 552.

Rebuilding is usually required by erosion of 499 and destructive scaling of the lower portion of 496, and involves torch cutting 496 at a satisfactory height and at 516; removal of slag and 499; replacement of 512, 518, 499 and the removed length of 496. Heliarc weld sealing the replacement length of 496, restacking and banding insulative bricks 520, completes the short rebuilding process. More complete rebuilding to replace cup assembly 523 involves removal of insulative bricks 520 and 521; cutting 596 at a satisfactory height; disconnecting 524, 534, 542, and 544; and change-out of pieces needing replacement.

Carbon selected for carbon monoxide production may be of any suitable description ranging from low ash coal products to petroleum sourced carbon black. The following examples assume that the carbon and oxygen purity specifications allow direct carbon monoxide production without additional purification except for nonvolatile ash-slag disposal.

Unless otherwise designated, all parts and percentages are by weight.

EXAMPLE A

Extruder Converted Resin

Polycarbonate resin such as that available from Mobay Chemical Corporation designated by the brand name "Merlon" or from the General Electric Company designated "Lexan" is processed through an extruder modified to include vapor input ports above the melt zone. Each vapor input zone is provided with a separate pressure regulator and inward flow of reactant vapor is adjusted to produce a completely end-capped polymer. Vaporous reaction products are vented through a evacuated exit port between the entry ports.

In a $3\frac{1}{2}''$ vertical 30/1 L/D, extruder, the upper inport port is about 14'' from the screw top (about 2'' below the feed section of the screw); the exhaust vent is about 26'' below the screw top; and the lower inport port is about 56'' below the screw top. The extruder is run at 90 rpm and produces a throughput of about 620 pounds of converted polycarbonate per hour, at a flange pressure of about 3,100 psi. The upper temperature control zone of the extruder corresponding to the feed section of the screw is maintained at 250° F. The first vent zone corresponding to the section between the feed section and the exhaust vent is maintained at 350° F. The second vent zone, corresponding to the section between the exhaust vent and the lower input port is maintained at 450° F. The remaining zones below the lower input port are maintained at 500° to 520° F. A pelletizing die assembly that incorporates filter screens and a final vent is maintained at 500° F.

An end-capping reagent such as trimethyl chlorosilane [$(CH_3)_3 SiCl$] is added at the upper and lower input vents at a total rate of about 25 to 30 pounds per hour on start-up. The rate of addition is then gradually reduced over a period of about one hour until a water-clear extrudate having completely converted end-caps is produced. Completeness of conversion is determined by the ability of a 3-mil film cast from a methylene chloride solution of the produced polymer to withstand 30 minutes contact at 300° F. with the residue of a 15% ammonium lauryl-sulfate-water solution without stress corroding. The minimum addition rate of trimethyl chlorosilane depends upon the rate of non-reactive escape and upon the polycarbonate feedstock molecular weight and ranges between about 5 pounds per hour and 12 pounds per hour.

EXAMPLE B

Solvent Atmosphere Converted Resin

POlycarbonate pellets such as resin designated "Lexan" or "Merlon" by the General Electric and Mobay companies are dissolved in methylene chloride solvent. About 100 parts of resin are dissolved in about 700 parts of solvent using a Neptune E. Blender. The solution is maintained at about 50° F. in a coaxial tube reactor described above. Above 5 parts of trimethyl chlorosilane [$(CH_3)_3 SiCl$] are gradually introduced to the solution circulated in the reactor. Circulation through the reactor is maintained at an average velocity of about 40' per second with a stainless steel centrifugal pump for about 30 minutes. The converted polymer in solvent solution is transferred to a second reactor and pressurized to 2,000 psi with a positive displacement Pesco A-200 pump. The temperature of the polymer-solvent solution in the second reactor is gradually increased by about 250° F. by countercurrent heat exchange from heated silicone fluid. The heated solution is then pressure sprayed through four carbide tipped spray nozzles aimed so the most divergent portion of the fan is to a 2'' deep, 4' wide, 10' long tray of water. Most of the methylene chloride solvent evaporates before the spray droplets fall on the water. The sprayed flakes of converted polycarbonate are washed on a stainless screen with additional water, dried by a Conair D-280 Drier and extruded by a 2'' extruder to produce pellets.

EXAMPLE C

Bisphenol A resin is dried by passing $-60°$ F. dew point, 250° F. air through a hopper containing the resin for three hours. 230 parts dried bisphenol A resin is mixed in 1,000 parts dimethyl sulfoxide and entered into a coaxial tube reactor by a Pesco A-100 positive displacement pump and circulated at 40' per second average velocity. Additional solvent is added to completely fill the reactor volume. The solution is pressured to 100 psi by heating to about 220° F. in response to circulation of heated silicone fluid through the annular space between the outer tube and the inner tube of the reactor. Hydrogen is added until the total pressure is about 250 psi. Thirty parts carbon monoxide produced by reacting carbon with oxygen in a fluidized column are added to the circulating solution of bisphenol A and dimethyl sulfoxide at about 300 psi. The temperature of the circulating solution is reduced by heat exchange to 200° F. silicone fluid to about 210° F. during CO addition to maintain 300 psi overall pressure. Circulation is continued for about 15 minutes or until the desired molecular weight has been reached. The molecular weight is then fixed and the end groups capped by adding about 25 parts Rhodamine 123. The temperature is then increased by circulation of 300° F. silicone fluid through the annular space between the coaxial tubes of the reactor and the pressure is increased by the restricted thermal expansion of the solvent-solute solution to about 2,000 psi. Polycarbonate flakes are produced by spraying the 2,000 psi solution over a bath of 70° F. isopropanol. Solvent escapes from the atomized spray as solidified polycarbonate falls into the isopropanol to be collected.

EXAMPLE D 230 units of dry bisphenol A are dissolved in 1000 units of dry methanol at 80° F. The solution is pumped into a Type 316 stainless steel coaxial tube reactor by a Pesco A-100 pump and circulated at about 40 feet per second. The solution is heated and pressurized to about 255° F., 400 psi by circulation of heated silicone fluids in the annular space between the inner tube and the outer tube. Three parts hydrogen are passed through an electrical arc activator and added to the circulating solution. 35 parts carbon monoxide at about 250° F., 500 psi are added. The solution is slowly cooled to 80° F. and added to 1000 units methylene chloride. The double solvent solution is circulated with samples taken every five minutes until a suitable molecular weight is reached. The molecular weight growth is terminated and end caps are developed by adding 1.5 parts 3-amino chloroacridine. The polycarbonate rich methylene chloride solution is centrifugally separated from the methanol solution and polycarbonate is precipitated by any suitable means or deposited as a clear varnish upon evaporation of the methylene chloride solvent.

EXAMPLE E 100 units of dry polycarbonate are dissolved in 1200 units methylene chloride. 750 units dry methanol are added and a portion of the solution is transferred to the inner tube of a 1000 ml stainless steel coaxial tube reactor packed with wheat grain size zinc shot. This portion is designated Sample "A". Silicone oil is circulated between the outer tube and inner tube for temperature control. The solution in the inner tube is circulated through the zinc shot with a hermetically sealed positive displacement pump. The circulating solution is brought to 250° F. and 15 units of 1,1,2-trichloro-1,2,2-trifluoroethane are added. Circulation is contained for 10 minutes at 250° F. and then cooled to 70° F.

Polycarbonate from samples of the reacted solution (Sample A) and the unreacted solution (Sample B) are cast by evaporation. Sample A is found to resist stress corrosion from 15% ammonium lauryl sulfate solution residues at 300° F. while Sample B fails to resist stress corrosion under the same test.

EXAMPLE F 100 parts of Lexan polycarbonate are dissolved in 700 parts methylene chloride at 70° F. A sample of solution is withdrawn and marked Sample A. 5 parts 1-naphthoyl chloride are added to the remaining solution and the solution is stirred for 30 minutes. A second sample is withdrawn and marked Sample B. Fims are cast from Samples A and B. Comparison of accelerated ultraviolet testing of Samples A and B show marked differences with Sample B showing reduced yellowing and embrittlement due to ultraviolet exposure. A and B comparisons of stress corrosion due to exposure to the residues of a 15% ammonium lauryl sulfate-water solution at 300° F. show reduced effect upon Sample B.

Unless otherwise indicated all parts and units are by weight. Parts and units are used interchangeably. The composition can comprise, consist essentially of, or consist of the materials set forth. The process can comprise, consist essentially of or consist of the steps set forth.

It has further been found that there can similarly be prepared polyester resins having phenolic and/or alcoholic end groups replaced by the halohydrocarbon, halocarbon or silane groups. The polyesters are made from the same dihydroxy compounds as previously set forth and dibasic carboxylic acids such as phthalic acid, terephthalic acid, isophthalic acid, 4,4'-benzophenone dicarboxylic acid, 4,4'-diphenylsulfone dicarboxylic acid, succinic acid, adipic acid, azelaic acid, sebacic acid, malonic acid, oxalic acid, glutaric acid, suberic acid. Mixtures of dibasic acids can be used. The preferred dibasic acid is terephthalic acid. The preferred polyesters are those made from either bisphenol A alone or ethylene glycol alone or a mixture of ethylene glycol and bisphenol A together with terephthalic acid. The ratio of repeating units when two different dihydroxy compounds are used can range from 5:95 to 95:5, usually from 10:90 to 90:10. When employing bisphenol A and ethylene glycol the range is preferably from 90:10 to 20:80.

The bisphenol A terephthalate component imparts a higher melting point and better physical characteristics whereas the ethylene glycolterephthalate components impart better workability and clarity.

The preferred end group supplier is trimethyl chlorosilane. The fluorine compounds work well but are normally more costly.

In addition to the dihydroxy alcohol, compounds previously set forth additional dihydric alcohols which can be used include cyclohexane dimethanol, propylene glycil, dipropylene glycol.

The polyesters thus have the formula

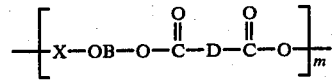

where X is the stress corrodant prevention group, B is a dihydric alcohol or dihydric phenol residue, D is the dicarboxylic acid residue and m is an integer defining the molecular weight of the polymer.

The copolymer polyesters from a plurality of dihydroxy compounds have the formula

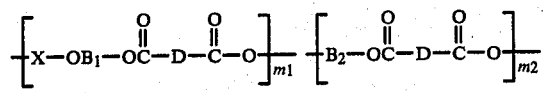

where $B_1$ is the residue of a first dihydric alcohol or phenol, $B_2$ is the residue of a second dihydric alcohol or residue, $m_1$ and $m_2$ each are integers of at least 1 and the total of $m_1$ and $m_2$ is such as to define the molecular weight of the polymer and X is as defined above. Both $B_1$ and $B_2$ can be residues of a dihydric alcohol, both can be residues of a dihydric phenol or one can be a residue of a dihydric alcohol and the other a residue of a dihydric phenol or one or both can be a residue of a compound having one alcohol group and one phenol hydroxy group.

EXAMPLE G 100 parts of ⅛" diameter×⅛" height pellets of a polyester copolymer having 10 parts bisphenol A terephthalate units and 90 parts ethylene terephthalate units are dried for 8 hours using 160° F. air of −20° F. dew point. After drying, the resin is extruded in a laboratory extruder having the venting and reactant porting provisions shown in FIG. 2. After steady-state extrusion operations are developed, trimethylchlorosilane (T.M.C.S.) is admitted along with argon carrier gas from 108 through regulator 124 at increasing flow rates until unreacted T.M.C.S. is detected at 120. Flat strip samples about 2½" wide by 1/32" thick are taken from a slit die attached to the output port of the extruder and marked Sample A. Regulator 124 is closed and after about 15 minutes of continued running additional samples of unconverted flat strip resin are retained and marked Sample B.

In accelerated stress corrosion tests of 10 hours at 300° F. (149° C.) using 15% ammonium lauryl sulfate solution residues, Sample A resists stress corrosion and is able to undergo 180° bending without breaking. Sample B shows surface degradation and is too embrittled to allow 180° bending.

EXAMPLE H

In the same procedure as in Example G a polymer having 50 parts ethylene terephthalate units and 50 parts bisphenol A terephthalate units is used. Converted Sample A resists accelerated stress corrosion. Unconverted Sample B does not.

EXAMPLE I

In the same procedure as in Example G a polymer having 90 parts bisphenol A terephthalate units and 10 parts ethylene terephthalate units is used. Sample A is considerably less degraded by 15% ammonium lauryl sulfate residues than unconverted Sample B.

EXAMPLE J

In the same procedure as in Example G, an ethylene glycol-modified polytetramethylene terephthalate polyester is used. Sample A resists stress corrosion more than unconverted Sample B.

EXAMPLE K

In the same procedure as in Example G, a copolyester of 50 parts ethylene terephthalate and 50 parts butylene terephthalate is used. Sample A resists stress corrosion more than unconverted Sample B.

EXAMPLE L

In the same procedure as in Example G, silicon tetrafluoride is used as the reactant in place of the trimethylchlorosilane and resin supplied by the B.F. Goodyear Tire and Rubber Co. known as "Clearstuff" P.E.T. (polyethylene terephthalate) are used to produce converted SAMPLE A specimens. Unconverted Sample B specimens were found to offer considerably less resistance to 300° F. (149° C.) steam degradation than converted Sample A specimens.

EXAMPLE M

In the same procedure as in Example F, 15 parts of 1-naphthoyl chloride were added to a solution of polyethylene terephthalate in methylene chloride. Sample B suffered considerably less loss of clarity than unconverted Sample A due to accelerated U.V. photon counts by Xenon lamp expsoure. Sample B also suffered considerably less embrittlement due to boiling water hydrolysis aging for 100 hours.

EXAMPLE N

In the same procedure as in Example F, 15 parts of 1-naphthoyl chloride were added to a copolyester of 70 parts ethylene terephthalate and 30 parts butylene terephthalate. Sample B suffered considerably less loss of clarity than unconverted Sample A due to accelerated U.V. photon counts by Xenan lamp exposure.

SAMPLE B also suffered considerably less embrittlement form 15% ammonium lauryl sulfate residue due to 100 hours over aging at 300° F.

EXAMPLE O 100 parts bisphenol A were dissolved in 1,500 parts THF (tetrahydrofuran). This solution is used to fill a $\frac{1}{2}''$ O.D.×0.035" wall, 100' long Teflon (polytetraflyoroethylene) tubing that is contained within a $\frac{3}{4}''$ O.D.×0.020" wall, 95' long Type 316 stainless steel tubing that is terminated on each end with Parker heat exchanger fittings to allow circulation of heat exchange fluids within the annulus between the teflon tubing and the stainless steel tubing. A small peristaltic pump is used to circulate the solution of bisphenol A and THF (tetrahydrofuran) endlessly through the Teflon tubing, and an insulated cannister of titanium-iron hydride granules, and a "T" connected to a pressure regulated carbon monoxide supply tank. An accumulator and pressure relief valve are also provided at the intake side of the pump. The circuit is essentially a combination of the polymerization portions of FIG. 4 and FIG. 5. 250° F. (121° C.) silicone fluid is circulated in the heat exchange annulus at a rate to develop hydrogen addition to about 5 psi over pressure to the circulating solution from the titanium-iron-hydride source. Carbon monoxide is then added at a rate to develop and additional 5 psi over pressure. The conditions are maintained for six hours and 15 parts of 1-naphthoyl chloride are added to terminate polymer chains that have been formed.

Samples of the resulting polycarbonate film produced by solvent evaporation were found to be more resistant to boiling water and U.V. degradation than Lexan Type 103 that was also cast from solvent solution.

EXAMPLE P

In the same method and apparatus as in Example O, 50 parts bisphenol A and 50 parts bisphenol Cy are dissolved in 400 parts THF, 400 parts methylene chloride, and 400 parts anhydrous methanol. The "T" delivering carbon monoxide to the circulating solution is electrically insulated from the type 316 ss cannister of titanium-iron-hydride granules by about 3" of $\frac{1}{4}''$ O.D.×0.040 Wall teflon tubing. Three volts D.C. are applied across the cannister to the carbon monoxide "T". After operating the polymerizing circuit as described in Example O for two hours the polymer chains are terminated by removing the applied voltage and adding 10 parts trimethylchlorosilane.

Samples of the resulting polycarbonate films formed by solvent evaporation were found to be more resistant to hydrolysis in boiling water than solvent cast films of Lexan Type 103.

EXAMPLE Q

Titanium-iron-hydride hydrogen storage media is prepared by mixing 48 parts of −320 mesh iron powder, 43 parts of −320 mesh titanium powder, 3 parts −320 mesh vanadium powder, 3 parts −320 mesh manganese powder, and 2 parts −320 mesh molybdenum powder with a binder of 3 parts molasses and 3 parts $Mg(OH)_2$ in a glove box under protective argon atmosphere. The mixture is then pelletized into briquetted pellets in a KOMAREK Model B 100 A briquetter.

The pellets are placed in a vacuum furnace and sintered on a graphite plate at 2,300° F. (1260° C.) for 3 hours. Hydrogen gas is then introduced and the furnace vacuum is relieved to about one atmosphere. The furnace is slowly cooled to room temperature in 20 hours and the pellets that result have a composition of nearly two percent hydrogen by weight. Stainless steel cylindrical cannisters originally designed for loose filter media housings were used to contain 100 parts of prepared titanium-iron-hydride pellets. 60×60 mesh retainer screens at the inlet and outlet ports were sufficient to contain the cannister contents.

Hydrogen release from hydride pellets is endothermic. More than 50% of the hydrogen can be released from the pellets by adding heat at 250° F. (121° C.). The pellets are rehydrided by draining the liquid solution, flushing with THF, and circulating the cannister with dry hydrogen at a sufficient rate to carry away excess heat and THF that are released during the exothermic regeneration.

What is claimed is:

1. A process of preparing a polycarbonate resin comprising passing a solution of dihydric phenol through a source of hydrogen to pick up hydrogen and reacting the dihydric phenol in the hydrogen containing solution with carbon monoxide, the hydrogen being present in an amount sufficient to activate the dihydric phenol.

2. A process according to claim 1 wherein the phenol consists of bisphenol A.

3. A process according to claim 1 wherein the phenol is a mixture of bisphenol A and 1,1-bis(4-hydroxyphenyl) cyclododecane.

4. A process according to claim 1 wherein the dihydric phenol solution is passed through a sintered solid having hydrogen stored therein.

5. A process according to claim 4 wherein the sintered solid is titanium-iron-hydride.

6. A process according to claim 5 including the step of capping the polycarbonate resin by replacing hydrogen end atoms with a group having fluorescent properties to provide ultraviolet light and stress corrosion protection.

7. A process according to claim 4 including the step of capping the polycarbonate resin by replacing hydrogen end atoms with a group having fluorescent properties to provide ultraviolet light and stress corrosion protection.

8. A process according to claim 1 including the step of capping the polycarbonate resin by replacing hydrogen end atoms with a group having fluorescent properties to provide ultraviolet light and stress corrosion protection.

* * * * *